G. G. PERCIVAL.
LIGHTING GAS BY ELECTRICITY.

No. 61,247.  Patented Jan. 15, 1867.

Witnesses:
W. B. Malonee, M.D.
M. B. Mosser, M.D.

Inventor
Geo. G. Percival M.D.

United States Patent Office.

GEORGE G. PERCIVAL, OF BROOKLYN, NEW YORK.

*Letters Patent No. 61,247, dated January 15, 1867.*

---

IMPROVEMENT IN LIGHTING GAS BY ELECTRICITY.

---

*The Schedule referred to in these Letters Patent and making part of the same.*

---

TO ALL WHOM IT MAY CONCERN:

Be it known that I, GEORGE G. PERCIVAL, of the city of Brooklyn, in the county of Kings, and State of New York, have invented a new and useful Improvement in Apparatus for Lighting Gas by Electricity; and I do hereby declare that the following is a full, clear, and exact description of the same. reference being had to the accompanying drawings, forming part of the specification, in which—

Similar letters of reference indicate like parts.

Figure 1:
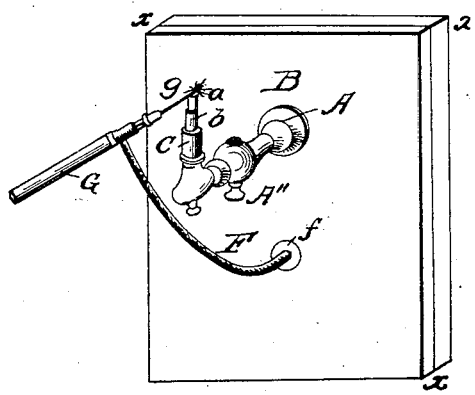
Figure 1 represents a perspective view of this apparatus, constructed according to my invention, while being used in the act of lighting the gas.
Figure 2:
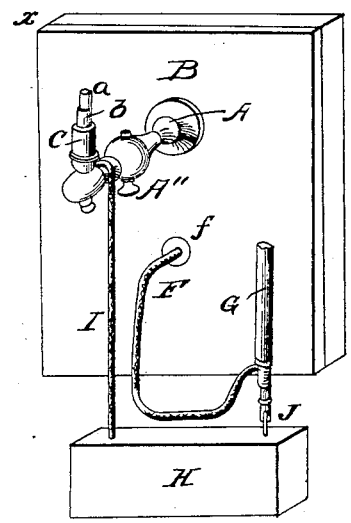
Figure 2 is a perspective view of the same, while the condenser is being charged.
Figure 3:
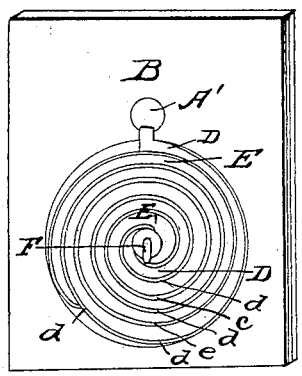
Figure 3 is a vertical section view through the line $x\ x$.

This invention consists in an attachment to a gas-burner, or the fixtures thereof, of a secondary pile or condenser for voltaic electricity, which, by being properly connected with any source of galvanic electricity of greater intensity (although it may be of less quantity) than itself, may become charged, as it were, with voltaic electricity, and which, when disconnected from this source of electricity, and there is no connection between the electrodes of the pile or condenser, will retain this charge till such connection is; from time to time, established, for the purpose of obtaining a current of voltaic electricity for the purpose of lighting the gas.

To enable others skilled in the art to make and use my invention, I will proceed to describe its construction and operation.

Any of the various forms of secondary piles, described in treatises on electricity, may be used. The following, though not the best, yet being very simple in its construction and operation, will best serve to illustrate the principle: If we take two plates of sheet lead, say two feet square, each, separate them by a thick layer of any kind of cloth capable of being moistened with dilute acid, and which will not be rotted by it, moisten this cloth with dilute sulphuric acid, (1 of acid to 10 of water,) and connect the plates with the poles of two small cups of Grove's battery, arranged for intensity, or with the poles of some other source of electricity, of at least equal intensity, the plate connected with the positive pole will become covered with a film of peroxide of lead, and the one connected with the negative pole with a film of hydrogen, (the layer of cloth will tend to prevent the escape of the hydrogen.) If, now, the battery be removed and these two plates be connected with each other, any suitable device for lighting the gas being interposed in the circuit, a current will flow from the plate covered with the hydrogen through the moistened cloth to the plate covered with the film of peroxide, and from thence along the conducting wire through the interposed device back to the plate with the film of hydrogen. It will continue flowing until these films are exhausted. Owing to the strong affinity of the peroxide for the hydrogen, the current will be of considerable intensity. (So long as these films or portions of them remain the pile will give off a current whenever connection is made between the plates, and, using a figurative language, we may say that galvanic electricity is stored up in the pile, as it was put there in the form of galvanic electricity, and can be drawn off in the same form by simply completing the circuit.) This electricity need not be all drawn off at once, but can be used from time to time, as may be desired, for the purpose of lighting the gas. We can render this electricity available for this purpose in various ways, (I do not limit my claim to any particular way,) either by heating a platina wire, or by passing the current through the inner coil of a Rhumkorf induction coil, and using the secondary current to light the gas, or by simply introducing into the circuit a helix, or flat spiral, or some equivalent device for producing a spark when the circuit is broken. We will suppose the latter method to be adopted. If, in the circuit of a pile similar to the one previously described, we insert a spiral of copper ribbon, it will, of course, give a spark. Let us suppose lead ribbon to be substituted for the copper, (the lead ribbon must be of sufficient size to compensate for its poor conducting power; it will, of course, still give a spark. We now have a pile composed of two plates of sheet lead, and a spiral composed of one ribbon of sheet lead. By making certain changes in this spiral we can make it answer the purpose of both the spiral and the pile. These changes are, first, making the spiral of two ribbons, instead of one; second, winding the two ribbons side by side, from centre to circumference, in such a manner that each coil (except the external one) of one ribbon may be embraced between two layers of the other ribbon; (these ribbons are, of course, to be separated throughout the whole extent by layers of some suitable kind of cloth;) third, connecting the conducting wires, one with the inner end of one ribbon, and the other with the outer end of the other ribbon; fourth, moistening the cloth with some proper solution. It is evident that this will answer the purpose of a pile. We will explain how it will answer the purpose of a spiral to a current generated within itself. Let it be charged and connection established. We will suppose each of the two ribbons (D and E) forming the pile to be divided by imaginary transverse divisions into one thousand equal lengths, numbering from centre to circumference. The current which is generated by the oxidation of the hydrogen in one division, (e. g., No. 431',) of ribbon D passes through the interposed moistened cloth to the opposite division (No. 431) of ribbon E, and returns by means of conducting wire and interposed device; but, before reaching this wire, it must pass through all the preceding divisions of E, (430 in number,) and, after passing the wire and reaching the external end of D, must pass through all the succeeding divisions of D, (1000'—431'=569 in number,) before it reaches its appropriate division. The same is true of that portion of the current which is generated in each of the other imaginary divisions. Thus every portion of the current (and consequently the whole current) passes through, in addition to the conducting wire, and interposed device, one thousand spaces (or one-half the entire length) of the lead ribbon forming the spiral. (If some portions of the current pass through a few divisions less than one thousand, others pass through as many more; so the general average of the whole is the same.) These ribbons, being long and narrow, act the part of conducting wires as well as the part of plates of the pile, and, being coiled in a spiral form, they exert the same inducing effect on the current that they would on one generated externally. Soft iron wires placed in the spiral, or laid on it radially, become magnetic, and the current, when broken, gives a spark. The inducing effect of this spiral is about equal to that of one made in the ordinary form, with one-half the length of ribbon.

A is a gas-bracket secured to a block, B, representing the wall of a room. C is a gas-burner, and has attached to its upper end a brass point, $a$, supported by the collar $b$. D and E are two ribbons of sheet lead, coiled side by side in a spiral form, and constituting a secondary pile or condenser similar to the one last described. It may be arranged in the wall, in the body of a chandelier, or in any convenient position. (For convenience in distinguishing them in the drawing, E is shaded darker than D.) The similar strips of cloth, $c$ and $d$, serve to prevent contact between these ribbons and to retain the solution in contact with them. Any kind of cloth which will not be rotted by the dilute acid may be used. This pile is supported by the spindle $e$, which is covered by the ornament $f$. A better way is to cover the ribbon to be connected with the negative pole with a strip of cloth wound round it in a spiral manner. In this way it will retain the hydrogen that may be given off in contact with the ribbon. The outer end of the ribbon D is connected with the gas-pipe A. The inner end of the other strip, E, is connected with the covered wire F, which has attached to its other end the needle-holder G, containing the needle $g$. This wire F should not be too large nor too good a conductor, as it would permit the pile to become exhausted too quickly. H is a block representing a voltaic battery of an intensity sufficient to charge the pile, i. e., of an intensity equal, or superior to, two cups of Grove's. A magneto-electric machine, or any suitable source of electricity, may be substituted for this battery. I is a copper wire representing the negative pole of the battery. It is bent at the top for the purpose of hooking over the bracket A. The short copper wire J represents the positive pole of the battery. It may be grasped by the needle-holder G, after the needle $g$ has been removed. To charge the pile or condenser, we connect the negative pole I of the battery H with the bracket A, which is in connection with the outer end of ribbon D, and the positive pole with the needle-holder G, and wire F, which is in contact with the inner end of plate E. The battery current now flows along wire F to the inner end of plate E, and along this plate towards its outer end, being gradually diminished in quantity as it proceeds by the passage of the current through the interposed layers of cloth to the plate D. By the time the current reaches the exterior of the spiral the whole of it will have passed sidewise, as it were, through the layers of cloth to plate D, from whence it proceeds along bracket A and negative wire I to the battery H. This current, in its passage from plate E through cloth to plate D, decomposes the solution with which the cloth is moistened, and causes a film of peroxide of lead to be formed on E, and a film of hydrogen on D. The battery is then removed. As long as these films, or portions of them, remain, the pile is charged, and will give off a current whenever the circuit is completed.

To light the gas, open the cock A'' of the bracket A; place the needle $g$ in contact with the point $a$. A current of electricity now originates at the external end of plate E, and, being gradually increased in quantity by the electricity transmitted through cloth from D, flows through the successive coils of this ribbon E until it reaches the inner end, from whence it proceeds along conducting wire F, needle-holder G, needle $g$, point $a$, burner C, bracket A, gas-pipe A', to outer end of ribbon D; and, being gradually diminished in quantity, through the successive coils of this ribbon, towards inner end, where it is reduced to nothing. On removing the needle $g$ from point $a$, the current is broken, and owing to the inducing effect of the spiral, (as previously described,) a spark is produced which lights the gas.

This invention may be applied with a single condenser to all the burners in a chandelier, room, building, or block of buildings; to permit each burner to be lighted independently of the other, by connecting one plate, D, of the condenser, with the gas-main A', and have the wire F long enough to reach the burners C' C'' C''' C''''; or, by having the wire F give off branches F' F'' F''' F'''', each branch being supplied with a needle-holder, G' G'' G''' G''''. The secondary pile or condenser, in the accompanying drawing, is not large enough for practical use. The ribbons should be each fifty feet long, (a length of twenty feet will give a faint spark, which, under favorable circumstances, may be made to light the gas;) besides, this pile gives up its charge too freely and runs down too quickly. Other devices than the one described may, of course, be used to render the current available for the desired purpose. If desired, the pile may be in any other form than that of a spiral. This condenser may be applied to self-generating hydrogen lamps, or to any gas-burner, or the fixtures thereof, no matter whether this burner is used for heating or illuminating purposes. The pile need not necessarily be in the immediate vicinity of the burner, but can be connected with it in any suitable manner. Where long conducting wires are used, or where other reasons render it expedient, secondary piles consisting of more than one pair of plates may be used; in which case the pairs can be charged in succession, or all charged at once, by having a battery of sufficient intensity. A battery of suitable intensity, but of very small quantity, may be permanently connected with the pile, if desired.

The idea of giving a spiral form to the pile is, in my opinion, original with me; but I do not here claim it, nor the use of plates of sheet lead; nor do I claim lighting gas by the spark produced by breaking the circuit; nor by heating a platina wire; nor by a Rhumkorf coil.

What I claim as my invention, and desire to secure by Letters Patent, is—

The attachment to a gas-burner of any kind, or to the fixtures thereof, of a secondary pile, which may be charged, as it were, with voltaic electricity, by being properly connected with any suitable source of electricity, and which will retain this charge until given off, from time to time, as may be required for the purpose of lighting the gas, the whole substantially as herein described.

GEO. G. PERCIVAL.

Witnesses:
 WM. H. COOPER,
 M. B. MASSER.